(12) United States Patent
Tsonakis et al.

(10) Patent No.: US 10,206,335 B2
(45) Date of Patent: Feb. 19, 2019

(54) DOUBLE TRAY SYSTEM FOR SEED SOWING OR SEEDLING TRANSPLANTATION

(71) Applicants: Iakovos Tsonakis, Marousi Attikis (GR); Aggelos Korkodilos, Kifisia Attikis (GR)

(72) Inventors: Iakovos Tsonakis, Marousi Attikis (GR); Aggelos Korkodilos, Kifisia Attikis (GR)

( * ) Notice: Subject to any disclaimer, the term of this patent is extended or adjusted under 35 U.S.C. 154(b) by 177 days.

(21) Appl. No.: 14/778,689

(22) PCT Filed: Mar. 21, 2014

(86) PCT No.: PCT/EP2014/055766
§ 371 (c)(1),
(2) Date: Sep. 21, 2015

(87) PCT Pub. No.: WO2014/147250
PCT Pub. Date: Sep. 25, 2014

(65) Prior Publication Data
US 2016/0044874 A1 Feb. 18, 2016

(30) Foreign Application Priority Data
Mar. 21, 2013 (NL) ..................................... 2010495

(51) Int. Cl.
*A01G 9/02* (2018.01)
*A01G 9/029* (2018.01)

(52) U.S. Cl.
CPC ........... *A01G 9/028* (2013.01); *A01G 9/0295* (2018.02)

(58) Field of Classification Search
CPC ....... A01G 9/028; A01G 9/104; A01G 9/0295
USPC ......................................................... 47/66.5
See application file for complete search history.

(56) References Cited

U.S. PATENT DOCUMENTS

| | | | | |
|---|---|---|---|---|
| 3,751,852 A | * | 8/1973 | Schrepper | A01G 9/028 220/23.6 |
| 3,810,329 A | * | 5/1974 | Lecuru | A01G 9/104 206/423 |
| 3,931,694 A | * | 1/1976 | Krikorian | A01G 9/104 47/87 |
| 4,008,543 A | * | 2/1977 | Vilt | A01G 9/088 141/1 |

(Continued)

FOREIGN PATENT DOCUMENTS

| EP | 2324696 A1 | 5/2011 |
|---|---|---|
| WO | 2011062470 A1 | 5/2011 |

*Primary Examiner* — Monica L Williams
*Assistant Examiner* — Ebony E Evans
(74) *Attorney, Agent, or Firm* — Birch, Stewart, Kolasch & Birch, LLP

(57) ABSTRACT

Thermoformed double tray system for cultivation of plants including a top tray which is stacked with a bottom tray. The top tray has cells for receiving a substrate. The bottom tray provides rigidity to the double tray system. The bottom tray has a baseplate which is provided with support elements to support the top tray. The baseplate has an outer edge which defines the outer contour of the bottom tray. A groove shaped deepening in the baseplate is extending in parallel with the outer edge. The deepening increases a bending stiffness of the bottom tray and provides rigidity to the double tray system. The deepening is provided with a reinforcing ribs which cross the deepening.

15 Claims, 5 Drawing Sheets

(56) References Cited

U.S. PATENT DOCUMENTS

| | | | | |
|---|---|---|---|---|
| 4,962,855 A | * | 10/1990 | Holmquist | B65D 21/0233 |
| | | | | 206/423 |
| 5,022,183 A | * | 6/1991 | Bohlmann | A01G 9/045 |
| | | | | 206/423 |
| 5,855,277 A | * | 1/1999 | Apps | B65D 1/243 |
| | | | | 206/203 |
| 6,651,384 B1 | * | 11/2003 | Williames | A01G 9/104 |
| | | | | 47/66.5 |
| 8,707,620 B2 | * | 4/2014 | Miller | A01G 9/104 |
| | | | | 47/66.5 |
| D783,421 S | * | 4/2017 | Van Belle | D9/760 |
| 2008/0120903 A1 | * | 5/2008 | Fair | A01G 9/104 |
| | | | | 47/65.7 |

* cited by examiner

DOUBLE TRAY SYSTEM FOR SEED SOWING OR SEEDLING TRANSPLANTATION

BACKGROUND OF THE INVENTION

1. Technical Field

This invention relates to a plastic double tray system for cultivating plants. The double tray system is configured to be used through an automatic sowing or transporting line. The double tray system comprises a bottom tray and a top tray. In particular, the double tray system is manufactured by thermoforming. In a thermoforming process a plastic sheet is heated to a pliable forming temperature, formed to a specific shape in a mold, and trimmed to create a usable product.

2. Background Art

Such a plastic double tray system is disclosed in EP2.324.696 in the name of the same applicant. This known double tray system is manufactured by thermoforming and has a stiffness and stability comparable to expanded polystyrene trays. The double tray system is configured for seed sowing and seedling transplantation. The double tray system has a top tray and a bottom tray. The top tray includes a plurality of cells and is configured for receiving seeds or seedlings. The bottom tray is configured to support the top tray and to provide rigidity to the double tray system. The bottom tray has a bottom side which has a rectangular outer contour defined by four straight outer edges. In a greenhouse, the double tray system is normally placed on a framework, in which the double tray system is supported by only two horizontally parallel extending support bars of the framework. Two opposite outer edges of the double tray system rests on the two horizontal bars. Hence, the double tray system is only supported at two end regions. A middle region at the bottom side of the double tray system is not supported, such that the double tray system is hanging in between the horizontal bars.

Due to the presence of the bottom tray which supports the top tray, the double tray system has a rigidity which allows such placement on two parallel horizontally extending supports at two opposite outer edges of the double tray system. However, it is still desired to increase the rigidity of the double tray system to prevent the double tray system from hanging down too far in between the two support elements.

The general object of the present invention is to at least partially eliminate the above mentioned drawbacks and/or to provide a useable alternative. More specific, it is an object of the invention to provide a more rigid double tray system.

SUMMARY OF THE INVENTION

The double tray system according to the invention is arranged for cultivation of plants, in particular for seed sowing and seedling transplantation. The double tray system comprises a top tray and a bottom tray.

The top tray of the double tray system is configured for receiving a substrate. To receive a substrate, the top tray comprises a plurality of cells. The cells are positioned in a cell pattern. Preferably, the cells of the top tray are positioned in a matrix. The matrix comprises a plurality of side-by-side positioned rows of cells. Each cell has a cell space for receiving the substrate. The cell space is defined by a circumferential cell wall and a cell bottom. Preferably, each cell space has a rectangular cross section.

The bottom tray of the double tray system is configured to support the top tray and to provide rigidity to the double tray system. Preferably, the bottom tray is formed out of a sheet by thermoforming. The bottom tray has a baseplate. At a top side, the bottom tray comprises a plurality of supporting elements for supporting the top tray. In particular, the supporting elements are configured to support the cell walls of the top tray. The support elements are in particular formed by frustum shaped projections which extends upwards from the baseplate. In an assembled condition of the double tray system, the support elements of the bottom tray are placed in between the cells of the top tray. An apex of the support elements may be in abutting engagement with the top tray. The form of the support elements of the bottom tray is complementary to a form of intermediate spaces in between neighbouring cells at a bottom side of the top tray. Preferably, the form of the support elements is a reverse negative of the geometry of the cells of at the bottom side of the top tray. In an assembled condition of the double tray system, at least a group of the support elements of the bottom tray are in abutting engagement with the circumferential cell walls of the cells of the top tray. This provides rigidity to the double tray system. The support elements of the bottom tray fill up spaces in between the cell walls of the top tray which prohibits the top tray from bending.

Further, the baseplate of the bottom tray has an outer edge which defines an outer contour of the bottom tray. To increase the rigidity of the double tray system, the bottom tray is improved by providing a groove shaped deepening in the baseplate of the bottom tray. Preferably, the groove shaped deepening protrudes away from the base plate in upwards direction. Seen from beneath the bottom tray, the groove shaped deepening is an elongated open deepening in the baseplate. Herewith, the bottom side of the bottom tray remains substantially flat which means that the bottom side is free of local projections. Preferably, the groove shaped deepening in the bottom tray is formed by thermoforming. Herewith, the deepening is integrated in the baseplate of the bottom tray. The complete shape of the bottom tray may be manufactured in one step by thermoforming a plastic sheet in one direction only. The groove shaped deepening is elongated and extends in a longitudinal direction in parallel with the outer edge. In particular, the groove shaped deepening extends substantially along an entire length of the base plate. This means that the groove shaped deepening extends from one side to an opposite side of the baseplate. The groove shaped deepening may extend substantially along a full length and/or a full width. Preferably, the groove shaped deepening extends substantially along a whole circumference of the base plate.

The groove shaped deepening intends to provide a first advantage in that, the groove shaped deepening increases the rigidity of the bottom tray. The groove shaped deepening forms a cambered baseplate which contributes to an increase of a bending stiffness about a horizontal axis of the bottom tray. The bottom tray provides a higher resistance against bending, when the double tray system is placed onto two supports at the outer regions of the double tray system. Advantageously, the more rigid bottom tray prevents the double tray system from bending down too far in between the two supports. The more rigid bottom tray allows the double tray system to be loaded more heavily. Herewith, the double tray system according to invention is suitable to be used for a larger variety of seedlings and plants.

It is further advantageous, that the groove shaped deepening is integrated in the baseplate of the bottom tray. The bottom tray is still a one-piece item. Advantageously, no further components are necessary to increase the rigidity of the double tray system. Other possible reinforcements, like implements of steel items are redundant. The double tray system is still a low-cost item which makes the double tray system according to the invention a very competitive product in the market.

The groove shaped deepening may provide a further advantage in that the groove shaped deepening may allow the double tray system to be used in a floating condition. The groove shaped deepening may have a closed bottom surface. The groove shaped deepening may form a closed pocket underneath the bottom tray which may encapsulate an air volume to get the double tray system in a floating condition which respect to a supporting surface. Advantageously, the double tray system is suitable to be used in a cultivation system comprising a floating table. Such a floating table has a table top surface as a support for the double tray system. The table top surface is in use provided with a layer of a fluid like water or air. The double tray system is suitable to be placed on top of the floating table to float on the layer of fluid. Advantageously, the double tray system allows a quick and easy transport.

In an embodiment of the double tray system according to the invention the groove shaped deepening extends along the entire outer edge of the baseplate. The groove shaped deepening is provided along the whole outer contour of the bottom tray. The groove shaped deepening substantially completely circumferences the bottom tray. Advantageously, the bending stiffness of the bottom tray is increased in two perpendicular directions. The bending stiffness is increased about a horizontal axis in a length direction of the bottom tray, but also about a horizontal axis in a width direction of the bottom tray.

In an embodiment of the double tray system according to the invention, the groove shaped deepening has a rounded bottom surface. Advantageously, the rounded bottom surface contributes in preventing cracks. One advantage is that the rounded bottom surface prohibits the propagation of initial cracks. Another advantage is that the rounded deepening is stronger and contributes to an increase of stiffness. The rounding of the deepening contributes to a more uniform distribution of material during a thermoforming process. During an expansion step in the thermoforming process which starts with a flat sheet material the rounded deepening is shaped, and material flows across the whole cross section of the deepening which prevents local thin portions. In particular, thin portions in a side wall of the deepening are prevented. In comparison with a sharp edged deepening, the rounded deepening has a substantially constant thickness of material along its cross section which makes the deepening stronger. Particularly, the groove shaped deepening has an arched shape in cross-section. Preferably, the groove shaped deepening is defined by a deepening side wall having a constant inner diameter. In particular, the groove shaped deepening comprises a height of and in particular an inner radius of at most 20 mm, more in particular to most 15 mm, but preferably at most 10 mm. Preferably, the groove shaped deepening has a a height of and in particular radius of at least 2 mm. In particular, the groove shaped deepening has a width of at most 20 mm, more in particular at most 15 mm, but preferably at most 10 mm. Advantageously such width and height dimensions of the groove shaped deepening facilitate an optimal thermoforming process. Furthermore, such limited dimensions of the deepening assure a desired minimum wall thickness which contribute to the bending stiffness of the bottom tray.

In an embodiment of the double tray system according to the invention the groove shaped deepening includes at least one rib for reinforcing the groove shaped deepening. Preferably, the groove shaped deepening includes a plurality of ribs. In particular, the deepening comprises at least six, more in particular at least ten, but preferably an amount of ribs which corresponds with an amount of rows of supporting elements positioned transversal to the deepening. The at least one rib is positioned inside the groove shaped deepening. The at least one rib extends in a direction traverse, in particular perpendicular, to the longitudinal direction of the groove shaped deepening. The at least one rib connects both side faces of the groove shaped deepening. Two neighbouring ribs may divide a groove shaped deepening into a pocket. Preferably, the rib has a height which corresponds with a depth of the deepening. Advantageously, the at least one rib inside the groove shaped deepening provide a reinforcement structure, a so-called 'mechanical network of reinforcing elements'. The at least one rib reinforces the groove shaped deepening to provide a resistance against bending forces. The at least one rib further increases the rigidity of the bottom tray. A plurality of ribs subdivides the deepening into a plurality of pockets which form the reinforcing elements of the so-called 'mechanical network'. Advantageously, a damage to one of the reinforcing elements will be compensated by surrounding reinforcing elements in the network. In use, one of such reinforcing elements may get damaged, but due to the mechanical network a damage to one of the reinforcing elements will not substantially weaken the whole mechanical structure of the bottom tray.

In an embodiment of the double tray system according to the invention the at least one rib which reinforces the groove shaped deepening is formed by thermoforming. In particular, the groove shaped deepening comprises a plurality of pockets which are separated by the thermoformed ribs. The pockets are expanded during the thermoforming process out of the original flat sheet material, while the ribs are at the same time created by leaving a portion of the flat sheet material unexpanded.

In an embodiment of the double tray system according to the invention, the bottom tray comprises an outer flange which includes at least one curvature. The outer flange is a curved portion of the baseplate. The curvature angles on the outer flange with respect to the baseplate. The outer flange is the limited by the outer edge of the baseplate and an inner edge. Preferably, the outer flange extends upwards away from a horizontal plane defined by the base plate. The at least one curvature is positioned in between the groove shaped deepening and the outer edge. The at least one curvature extends in parallel with the outer edge. The presence of the at least one curvature in the baseplate provides a further increase of rigidity of the bottom tray.

In an embodiment of the double tray system according to the invention, the bottom tray comprises a support rim for supporting the bottom tray on a support, in particular a support of a framework like a pair of parallel profiles. The support rim extends in parallel with the outer edge. The support rim is delimited by a longitudinal edge of the groove shaped deepening and the inner edge of the outer flange. The support rim is formed by spacing the outer flange apart from the groove shaped deepening. The support rim is positioned in between the groove shaped deepening and the outer flange.

In an embodiment of the double tray system according to the invention, the bottom tray comprises at an outer region a plurality of support elements for supporting the top tray, wherein the support elements have a truncated pyramid shape.

In an embodiment of the double tray system according to the invention, the bottom tray comprises at an outer region a plurality of support elements which comprise an extension in a side wards direction for supporting a cell wall of a cell of a top tray.

In an embodiment of the double tray system according to the invention, the bottom tray comprises a plurality of support elements at an outer region which intersects with the deepening. Preferably, the deepening is reinforced with at least one rib. Advantageously, the intermingling of reinforcing elements further contribute to a total stiffness of the bottom tray. The combination of reinforcing elements provide in the overlapping and intersecting arrangement a larger total increase in stiffness to the bottom tray than would be assumed based on a sum of a increase of stiffness when taken a contribution of a reinforcing measure on their own.

In an embodiment of the double tray system according to the invention, the top tray comprises a flange at an outer circumference. The flange extends away from a horizontal plane defined by the topside of the top tray. Preferably, the flange is directed down wards. The top tray including the plurality of cells and the flange can be made by thermoforming in one direction only. Advantageously, the flange of the top tray contributes to a further increase of the rigidity of the double tray system.

BRIEF DESCRIPTION OF THE DRAWINGS

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

DETAILED DESCRIPTION OF PREFERRED EMBODIMENTS

Figure 1A:
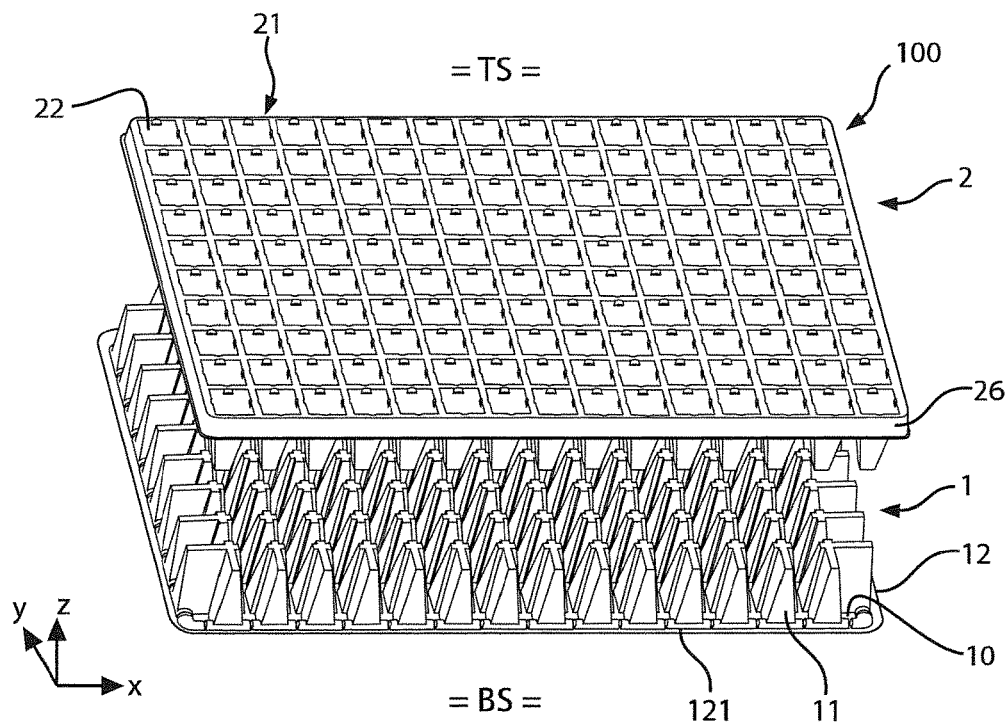
FIG. 1A shows an exploded view of a preferred embodiment of a double tray system according to the invention.

Identical reference signs are used in the drawings to indicate identical or functionally similar components.

To facilitate comprehension of the description and of the claims the words vertical, horizontal, longitudinal, cross-sectional—are to be understood with reference to gravity and functional use of the double tray system. The coordinate system X, Y, Z shown in the drawings—are used in a non-limiting way. The Z-axis defines a height or vertical direction. The X- and Y-axis define a horizontal plane, in which the X-direction defines a width direction and the Y-direction defines a length direction.

Figure 1B:
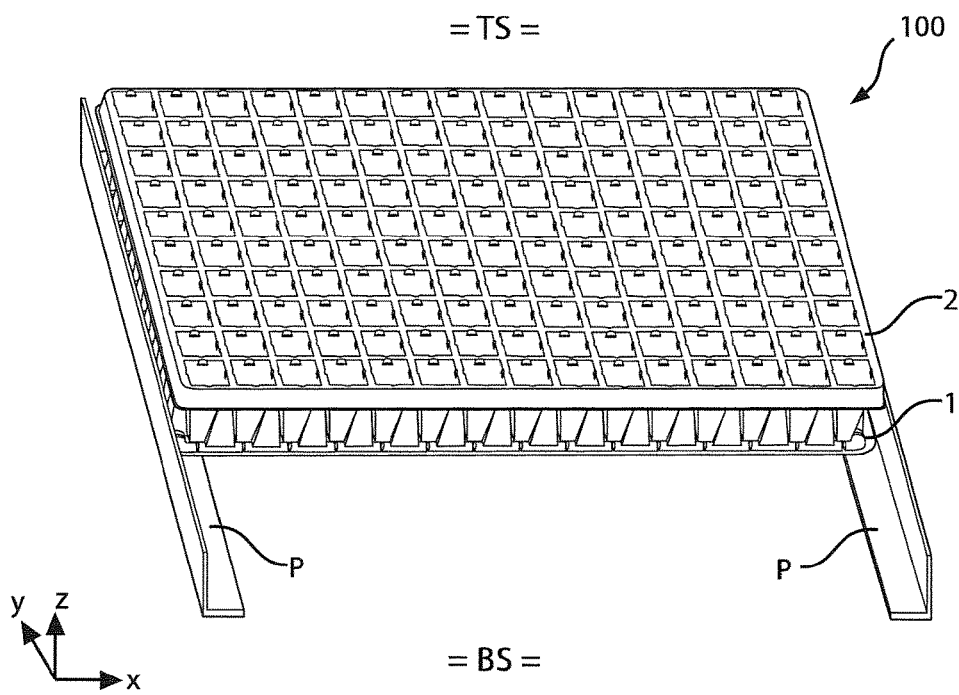
FIG. 1B shows the double tray system as shown in FIG. 1A in an assembled condition.

FIG. 1A shows in an exploded view a double tray system 100 according to the invention. FIG. 1B shows this double tray system 100 in an assembled condition. The double tray system is made of a recyclable material like PP (polypropylene), PS (polystyrene) or PET (polyethylene terephthalate) by a thermoforming process. The double tray system 100 has a bottom tray 1 and a top tray 2. Each of the bottom tray and the top tray are formed out of a sheet of a plastic material.

The top tray 2 is configured for cultivation of plants, in particular for seed sowing or seedling transplantation. The top tray 2 comprises a plurality of cells 21 for receiving a substrate. The substrate may comprise a seed, root plug or seedling. The top tray has at least one row of cells. The cells 21 are aligned in a cell pattern which is a matrix. The top tray has a functional topside TS and a functional bottomside BS. The topside of the top tray defines a horizontal plane. In its functional use, the plurality of cells 21 are open at the topside TS and can be filled from above. In use, plants grow on top of the double tray system. Each cell 21 has cell space with a receiving opening at the topside. The cell space is defined by a circumferential cell wall 22 and a cell bottom. The cell bottom may have a through hole for drainage of the cell space. The cell space has a substantially rectangular cross section. The circumferential cell wall includes four cell wall portions. The cell wall portions are positioned substantially perpendicular to each other.

The top tray to comprises a flange 26 at an outer circumference. The flange 26 extends away from the topside of the top tray. The flange 26 is curved away from the horizontal plane of the top tray. The flange 26 extends downwards away from the horizontal plane.

The bottom tray 1 is configured to support the top tray 2. The bottom tray has a functional top side TS for receiving the top tray. As shown in FIG. 1B, in the assembled condition of the double tray system, the bottom and top tray are stacked together. In the double tray system 100, the bottom tray 1 provides rigidity to the top tray 2. The bottom tray 1 provides a reinforcement to the top tray 2 to prevent the top tray from bending and sagging.

The bottom tray 1 comprises a baseplate 10. The baseplate has an outer edge 121 which defines an outer contour of the bottom tray 1. The baseplate 10 has a rectangular outer contour. The bottom tray 1 has a width in X-direction and a length in Y-direction which define a horizontal plane. The top tray 2 and bottom tray 1 are in shape complementary to each other. The bottom tray 1 has a shape which is a reverse negative of the top tray 2.

As shown in FIG. 1B, the double tray system 100 is supported at two end regions by two horizontally extending support profiles P. Two opposite edges of the bottom tray 1 are supported by a left and right positioned support profile P. By only supporting the double tray system at two opposite end regions, the double tray system 100 tends to hang down in a middle region. The double tray system 100 is designed to prevent a too far sagging. Measures are taken to provide a sufficient bending stiffness of the double tray system.

A measure to increase the bending stiffness of the double tray system is provided by the adaptation of the shape of the bottom tray 1 to the shape of the top tray 2. In the assembled condition of the double tray system, the top tray 2 rests on top of the bottom tray 1. The bottom tray 1 has a plurality of upstanding support elements 11 for supporting the top tray 2 from beneath in between the cells 21. The support elements 11 of the bottom tray 1 are positioned in between the downwardly extending cells 21 of the top tray 2. A support element 11 of the bottom tray 1 fills up an intermediate space in between two neighbouring cells 21 of the top tray 1 to prevent a relative movement of neighbouring cells 21 away from each other. A relative movement of two neighbouring cells 21 of the top tray 2 are locked by the underlaying support elements 11 of the bottom tray which are positioned aside the cells. Such a relative movement would occur when the top tray bends down. Herewith, the support elements 11 reduce a possible bending of the top tray when the top tray is loaded and supported at only two opposite end regions.

Figure 2A:
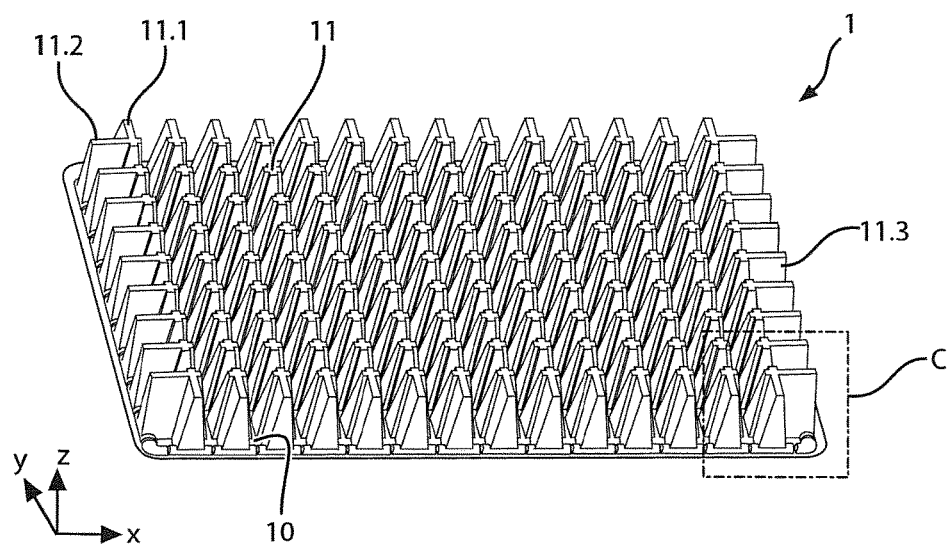
FIG. 2A shows a perspective view—seen from above—of a bottom tray 1 according to the invention.
Figure 2B:
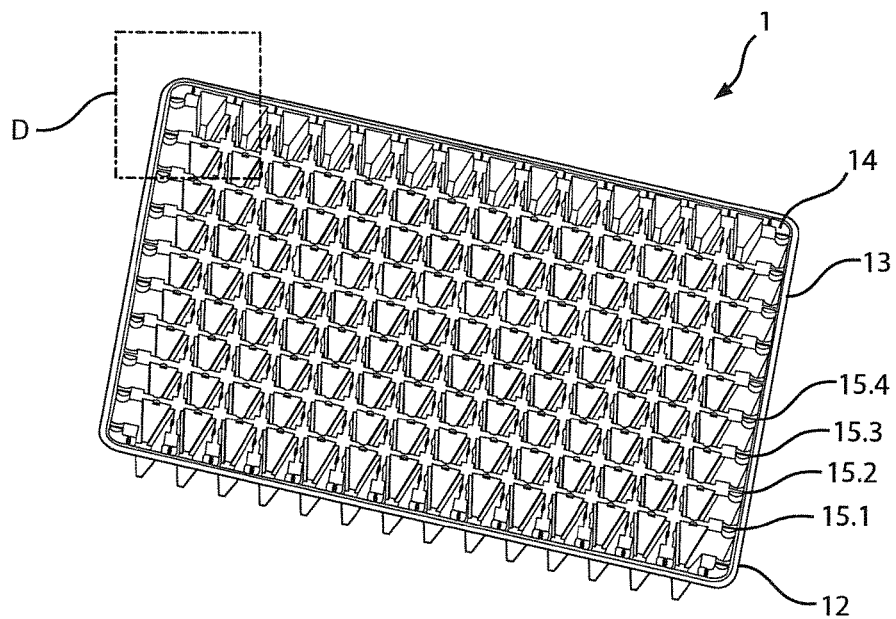
FIG. 2B shows a perspective view—seen from beneath—of the bottom tray 1 as shown in FIG. 2A.

FIG. 2A shows a perspective view—seen from above—of the bottom tray 1 as shown in FIG. 1A. FIG. 2B shows a perspective view—seen from beneath—of the bottom tray 1.

As shown in FIG. 2A, the bottom tray 1 has a functional topside TS and a functional bottom side BS. A top tray can be stacked from above with the bottom tray to assemble the double tray system. The bottom tray 1 is made out of a plastic sheet material. The bottom tray 1 has a baseplate 10. At the topside, the bottom tray 1 is provided with a plurality of support elements 11. The support elements 11 are arranged in a matrix of rows. The bottom tray 1 has a middle region and an edge region. The support elements 11 in the middle region have a frustum shape. A cross-sectional size of the support element 11 decreases in a direction away from the baseplate 10. A width and length dimension in cross-section of the support element 11 decreases in a direction away from the base plate 10. The support elements 11 are configured to support cells 21 of a top tray including a rectangular cross-section. In the assembled condition of the double tray system, a cell 21 in a middle region of the top tray is enclosed by four surrounding support elements 11 in the middle region of the bottom tray. These four support elements 11 provide a support at corner edges of the cells 21. The support elements 11 have substantially flat support side walls for supporting substantially flat cell walls of the cells 21.

In particular, each support element 11 in the middle region has a shape of a truncated square pyramid. The support element 11 has a substantially square pyramid base. The top of the pyramidal shape is truncated. The pyramid corner edges are recessed for receiving a corner edge of a cell 21.

The support elements 11 at the edge region of the bottom tray 1 have a similar shape as the support elements in the middle region, but differ in that at least one side face is extended to the outer edge. The extended side face forms a support element extension 11.1. The support elements 11 which are positioned at the corners of the base plate have two extended side faces, two support element extensions 11.1, 11.2. The support elements 11 at the outer region in between the corner positioned support elements have only one side face extended to the outer edge. The support elements 11 in between the corner positioned support elements have only one support element extension 11.3. The extensions at the outer region of the bottom tray provide a support to cell walls of cells 21 which are positioned at an outer region of the top tray. The cell walls of the most outer positioned cells are supported by the pyramid extensions of the most outer positioned support elements of the bottom tray. The cells are locked in between the extended side faces to prevent bending of the top tray.

Further technical measures are incorporated in the design of the double tray system which further increase the bending stiffness of the double tray system. The additional bending stiffness is provided by the configuration of the base plate of the bottom tray 1, which is shown in further detail in FIG. 2C and FIG. 2D.

Figure 2C:
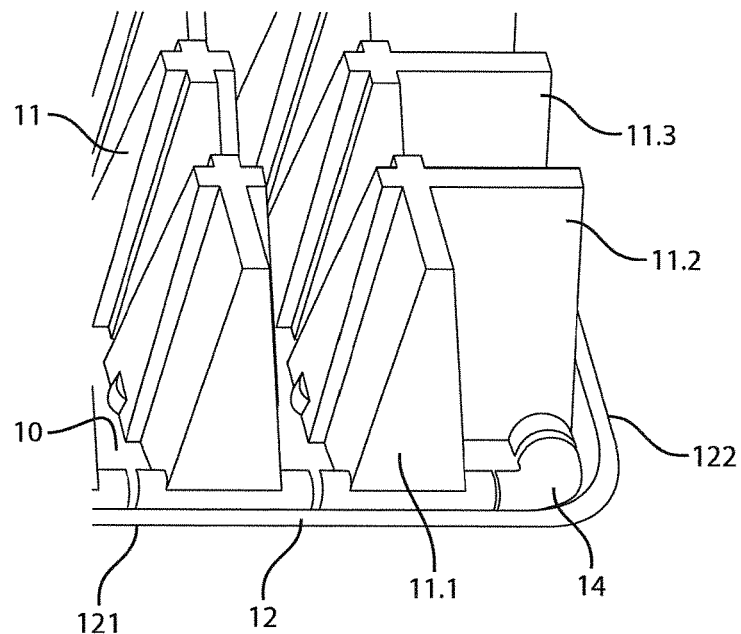
FIG. 2C shows a corner of the bottom tray as shown in FIG. 2A in further detail.
Figure 2D:
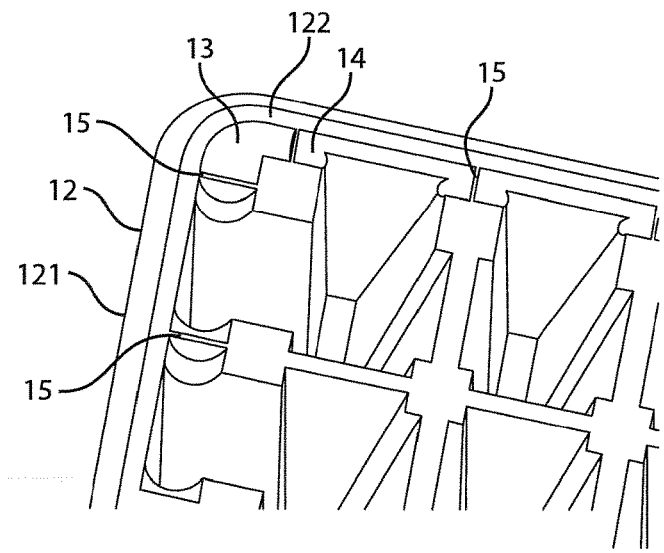
FIG. 2D shows a corner of the bottom tray as shown in FIG. 2B in further detail.

FIG. 2C shows a top view of a corner region of the bottom tray 1 as shown in FIG. 2A in further detail. FIG. 2D shows the corner region of the bottom tray as shown in FIG. 2B in further detail. The outer edge 121 is rounded about a vertical axis at a corner region of the base plate 10. The bottom tray 1 has a base plate 10. The base plate 10 extends substantially in a horizontal plane. The base plate 10 has an outer flange 12. The outer flange 12 of the base plate 10 is delimited by an inner edge 122 and the outer edge 121. The outer flange is curved with respect to the horizontal plane. The outer flange 12 has a curvature which contributes to the bending stiffness of the double tray system. Preferably, the outer flange 12 of the base plate 10 extends in an upwards direction.

A groove shaped deepening 14 is provided aside the outer flange 12 of the bottom tray. Seen from above, the groove shaped deepening 14 forms a deepening which protrudes upwards away from the baseplate. The groove shaped deepening is formed by expanding the sheet material which is used to form the bottom tray. The groove shaped deepening 14 is formed by thermoforming. To facilitate the thermoforming process, the deepening has preferably a rounded bottom. The deepening includes a rounding from the bottom of the deepening to a sidewall of the deepening which contributes to a uniform distribution of material during the forming of the deepening. As a result the deepening has a constant wall thickness.

The groove shaped deepening is open at the bottom side of the bottom tray. The groove shape deepening is elongated and extends in a longitudinal direction in parallel with the outer edge. The groove shaped deepening may be provided along at least one straight portion of the outer edge. Preferably, the deepening 14 extends along the entire outer edge 121 of the bottom tray. The presence of the elongated deepening 14 further contributes to the bending stiffness of the bottom tray.

The elongated deepening is spaced apart from the inner edge which delimits the outer flange of the bottom tray. A portion in between the elongated deepening and the inner edge forms a support rim 13. The support rim extends along the entire circumference of the bottom tray. The support rim 13 provides further strength to the bottom tray and serves to stably place the bottom tray at a ground surface.

As shown in further detail in FIG. 2O, the groove shaped deepening 14 is subdivided into groove shaped pockets by at least one rib 15. The at least one rib extends in a transversal direction with respect to the longitudinal direction of the deepening. The at least one rib crosses the deepening. The at least one rib intersects the elongated deepening. The at least one rib is formed by thermoforming. The at least one rib 15. 1, 15.2, 15.3, 15.4 provides a reinforcing structure to the base plate of the bottom tray. A plurality of ribs is provided which 25 forms the reinforcing structure of reinforcing elements. Herewith, the at least one reinforcing rib further contributes to the bending stiffness of the bottom plate.

Figure 3A:
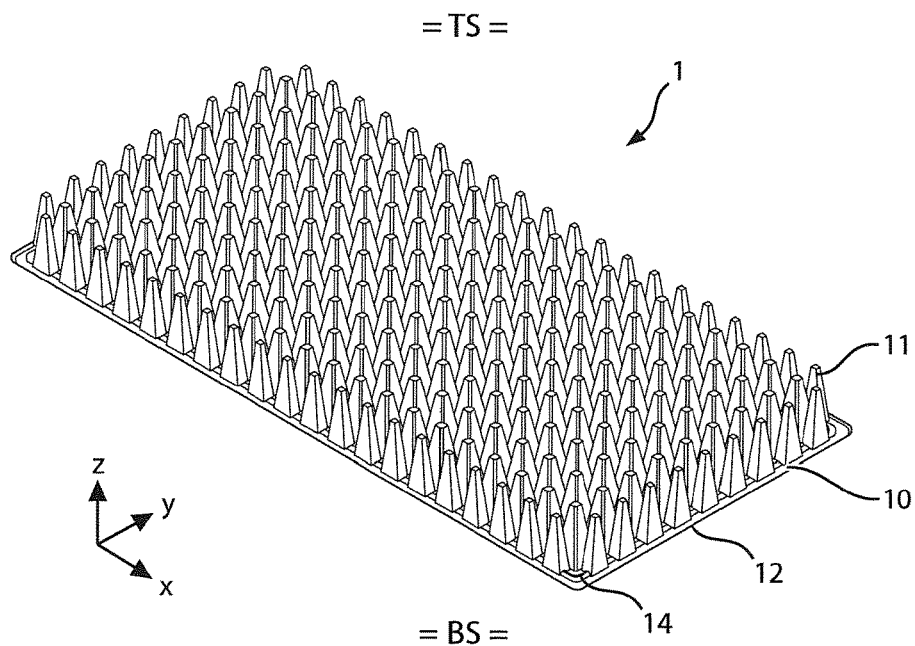
FIG. 3A shows in a perspective view—seen from above—an alternative embodiment of the bottom tray according to the invention.
Figure 3B:
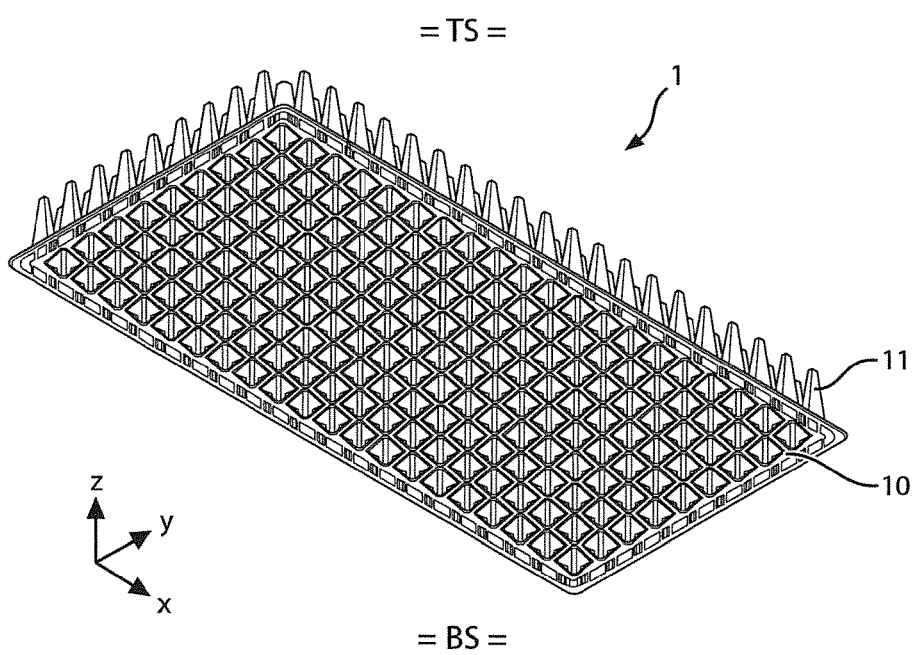
FIG. 3B shows a perspective view—seen from beneath—of the bottom tray 1 as shown in FIG. 3A.
Figure 3C:
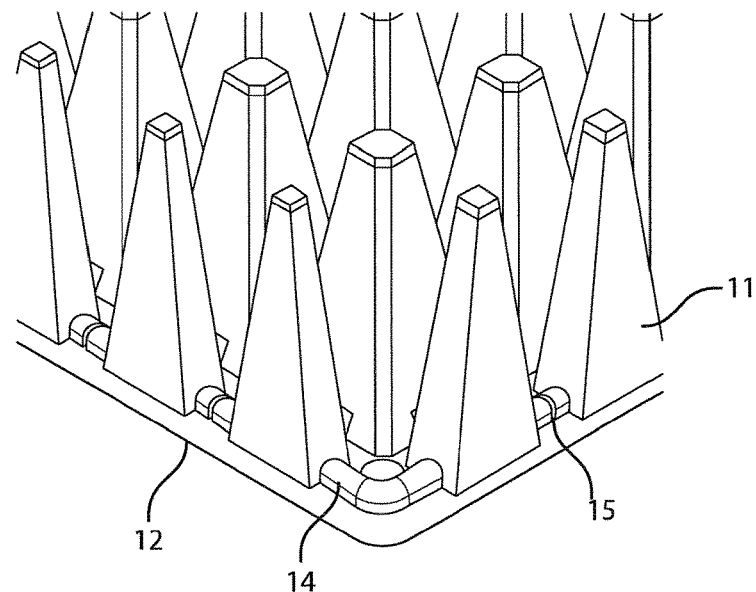
FIG. 3C shows a corner of the bottom tray as shown in FIG. 3A in further detail.
Figure 3D:
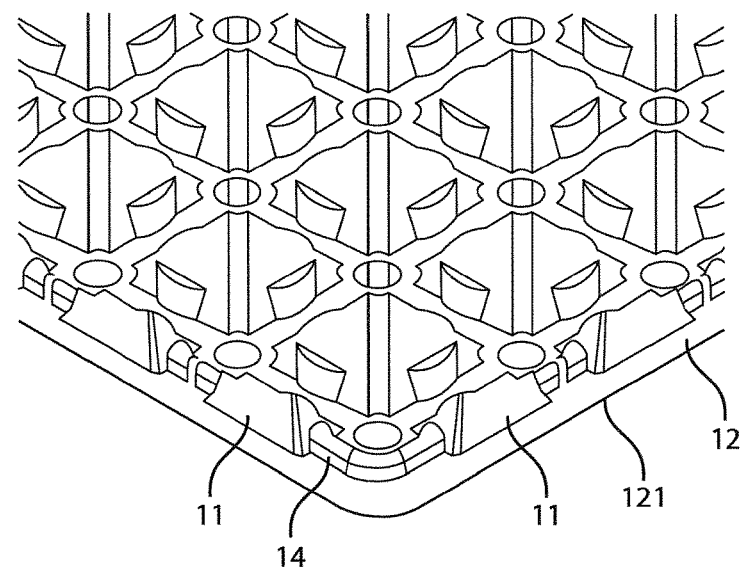
FIG. 3D shows a corner of the bottom tray as shown in FIG. 3B in further detail.

FIG. 3A and FIG. 3B show in respectively a top view and a bottom view an alternative embodiment of the bottom tray according to the invention. The bottom tray corresponds with the bottom tray of FIG. 2 in that the bottom tray of FIG. 3 has incorporated the same reinforcing measures of a curved outer flange 12, an elongated deepening 14 and at least one reinforcing rib 15 which crosses the deepening. The bottom tray of FIG. 3 differs from the bottom tray of FIG. 2 in that the bottom tray of FIG. 3 comprises another shape of the support elements 11 at the outer region of the bottom tray. FIG. 3C shows the support elements 11 at the outer region in further detail. The support elements 11 at the outer region of the bottom tray have a pyramid shape. The support elements 11 at the outer region of the bottom tray are stand-alone projections and do not have a connection with the support elements 11 at the middle region of the bottom tray. In comparison with the embodiment of the bottom tray as shown in FIG. 2C, the support elements 11 at the outer region of the bottom tray in FIG. 3C are positioned closer to the outer edge of the bottom tray. In FIG. 2C, the support elements at the outer region partly overlap the elongated deepening, while in FIG. 3C, the support elements at the outer region fully overlap the elongated deepening. In FIG. 3C, the elongated deepening 14 fully intersects with the support elements 11 at the outer region. The elongated deepening 14 is fully incorporated in the support elements at the outer region.

Numerous variants are possible in addition to the embodiment shown. In a variant, the elongated deepening may e.g. extend along only two opposite straight outer edges of the bottom tray.

Although the invention has been disclosed with reference to particular embodiments, from reading this description those of skilled in the art may appreciate a change or modification that may be possible from a technical point of view but which do not depart from the scope of the invention as described above and claimed hereafter. Modifications may be made to adapt a particular situation or material to the teachings of the invention without departing from the essential scope thereof. It will be understood by those of skilled in the art that various changes may be made and equivalents may be substituted for elements thereof without departing from the scope of the invention. Therefore, it is intended that the invention is not limited to the particular embodiments disclosed in the above detailed description, but that the invention will include all embodiments falling within the scope of the appended claims.

Features and aspects described for or in relation with a particular embodiment may be suitably combined with features and aspects of other embodiments, unless explicitly stated otherwise. It is remarked that any feature of the double tray system according to the invention which is described in the embodiments and/or mentioned in the dependent claims is in itself considered patentable without any dependency to another presented feature. In particular, any measure presented in a dependent claim is also considered patentable without dependency of the independent claim. For example, the double tray system can be reinforced by applying a flange at the top tray and an outer flange at the bottom tray wherein the at least one of those flanges extends away from a horizontal plane without applying the groove shaped deepening in the bottom tray.

Thus, the invention provides a double tray system for cultivation of plants. The double tray system includes a bottom tray which provides rigidity to a top tray. The bottom tray is strengthened by incorporating several technical measures. In particular, the incorporation of an elongated rounded deepening having a substantially constant wall thickness and which extends in parallel along an outer edge of the bottom tray contributes to a reduction of a risk oncracks and a significant increase in bending stiffness of the double tray system.

The invention claimed is:

1. A double tray system for cultivation of plants comprising:
   a top tray including a plurality of cells for receiving a substrate, wherein each cell includes a cell space which is defined by a circumferential cell wall and a cell bottom; and
   a bottom tray for supporting the top tray, the bottom tray including a baseplate, wherein the baseplate comprises:
      a bottomside;
      a topside;
      a plurality of supporting elements for supporting the top tray, said supporting elements project at the topside away from the baseplate, wherein the baseplate has an outer contour which is delimited by an outer edge; and
      a groove shaped deepening which is open at the bottomside of the baseplate, said groove shaped deepening protrudes at the topside away from the baseplate, said groove shaped deepening is elongated and extends in a longitudinal direction in parallel with the outer edge of the baseplate,
   wherein the groove shaped deepening includes a plurality of ribs formed on the bottomside of the baseplate, the ribs and the supporting elements separating the groove shaped deepening into a plurality of groove shaped pockets and each rib extends in a direction transverse the longitudinal direction of the respective groove shaped pocket,
   wherein the ribs are positioned external from the supporting elements,
   wherein each groove shaped pocket is positioned adjacent to at least one of the plurality of supporting elements,
   wherein each rib is positioned between a pair of neighboring supporting elements of said plurality of supporting elements, and
   wherein the outer edge surrounds and is spaced from the groove shaped deepening.

2. The double tray system according to claim 1, wherein each groove shaped pocket has a rounded bottom surface.

3. The double tray system according to claim 1, wherein each groove shaped pocket has a closed bottom surface.

4. The double tray system according to claim 1, wherein at least one rib of said ribs is formed by an expanding step of a thermoforming process by expanding the pockets, while leaving at the same time a portion of the baseplate unexpanded.

5. The double tray system according to claim 1, wherein the baseplate of the bottom tray comprises an outer flange which is curved with respect to a horizontal plane defined by the baseplate.

6. The double tray system according to claim 5, wherein the bottom tray comprises a support rim for supporting the bottom tray to a supporting surface, and
   wherein the support rim extends in parallel with the outer edge and is positioned in-between the groove shaped deepening and the outer flange.

7. The double tray system according to claim 1, wherein the groove shaped pockets with support elements of said plurality of support elements located at an outer region of the bottom tray.

8. The double tray system according to claim 7, wherein the support elements which are positioned at the outer region of the bottom tray comprise an extension in a sideward direction for supporting a cell wall of a cell of a top tray.

9. The double tray system according to claim 1, wherein the top tray comprises a flange at an outer circumference, wherein the flange extends away from a horizontal plane defined by the topside of the top tray.

10. The double tray system according to claim 1, wherein the double tray system is a thermoformed double tray system.

11. A bottom tray for a double tray comprising:
a baseplate including:
  a bottomside;
  a topside;
  a plurality of supporting elements for supporting a top tray, said supporting elements project at the topside away from the baseplate, wherein the baseplate has an outer contour which is delimited by an outer edge; and
  a groove shaped deepening which is open at the bottomside of the baseplate, said groove shaped deepening protrudes at the topside away from the baseplate, said groove shaped deepening is elongated and extends in a longitudinal direction in parallel with the outer edge of the baseplate,
wherein the groove shaped deepening includes a plurality of ribs formed on the bottomside of the baseplate, the ribs and the supporting elements separating the groove shaped deepening into a plurality of groove shaped pockets and each rib extends in a direction transverse the longitudinal direction of the respective groove shaped pocket,
wherein the ribs are positioned external from the supporting elements,
wherein each groove shaped pocket is positioned adjacent to at least one of the plurality of supporting elements,
wherein each rib is positioned between a pair of neighboring supporting elements of said plurality of supporting elements, and
wherein the outer edge surrounds and is spaced from the groove shaped deepening.

12. The double tray system according to claim 1, wherein each support element of the plurality of support elements has a base surface having a substantially square pyramid shape and a top surface having a truncated shaped.

13. The bottom tray according to claim 11, wherein each support element of the plurality of support elements has a base surface having a substantially square pyramid shape and a top surface having a truncated shaped.

14. The double tray system according to claim 12, wherein support elements of said plurality of support elements located at the corners of the bottom tray include two extensions, one of the extensions extending towards different side surface of the outer edge of the bottom tray than the other of said the extensions.

15. The bottom tray according to claim 13, wherein support elements of said plurality of support elements located at the corners of the bottom tray include two extensions, one of the extensions extending towards different side surface of the outer edge of the bottom tray than the other of said the extensions.

* * * * *